(12) United States Patent
Gaiser et al.

(10) Patent No.: US 8,344,682 B2
(45) Date of Patent: Jan. 1, 2013

(54) METHOD AND APPARATUS FOR FAILSAFE MONITORING OF A MOVEMENT VARIABLE ON AN ELECTRICAL DRIVE

(75) Inventors: Roland Gaiser, Uhingen (DE); Marcus Gossner, Kaufbeuren (DE); Dirk Scheffner, Hopferau (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 13/357,834

(22) Filed: Jan. 25, 2012

(65) Prior Publication Data

US 2012/0187884 A1 Jul. 26, 2012

Related U.S. Application Data

(63) Continuation of application No. PCT/EP2010/060685, filed on Jul. 23, 2010.

(30) Foreign Application Priority Data

Jul. 27, 2009 (DE) .......................... 10 2009 035 998

(51) Int. Cl.
*H02P 3/18* (2006.01)
(52) U.S. Cl. .............. 318/712; 318/400.02; 318/400.17; 318/432; 318/722; 318/717; 318/268; 318/434; 318/490
(58) Field of Classification Search ............. 318/400.02, 318/400.17, 712, 432, 434, 719, 722, 721, 318/717, 268
See application file for complete search history.

(56) References Cited

U.S. PATENT DOCUMENTS

| 4,733,148 | A | * | 3/1988 | Rodi .............................. 318/490 |
| 5,635,810 | A | | 6/1997 | Goel |
| 6,140,789 | A | * | 10/2000 | Kachi et al. ................... 318/603 |
| 6,194,856 | B1 | * | 2/2001 | Kobayashi et al. ........... 318/432 |
| 6,262,555 | B1 | * | 7/2001 | Hammond et al. ........... 318/759 |
| 6,323,737 | B1 | * | 11/2001 | Broekaert ........................ 331/57 |
| 6,786,896 | B1 | * | 9/2004 | Madhani et al. .................. 606/1 |
| 7,378,815 | B2 | | 5/2008 | Losch et al. |
| 7,728,537 | B2 | * | 6/2010 | Tomigashi ............... 318/400.02 |
| 7,737,652 | B2 | * | 6/2010 | Schwesig ...................... 318/432 |
| 2006/0055361 | A1 | | 3/2006 | Eisenhardt et al. |
| 2008/0309265 | A1 | | 12/2008 | Terada et al. |

FOREIGN PATENT DOCUMENTS

DE 34 47 090 A1 6/1986

(Continued)

OTHER PUBLICATIONS

ISA/EP; English language translation of International Preliminary Report on Patentability (Chapter 1); issued by WIPO Feb. 7, 2012; 10 pages.

*Primary Examiner* — Rita Leykin
(74) *Attorney, Agent, or Firm* — Harness, Dickey & Pierce, P.L.C.

(57) ABSTRACT

A first and a second drive current for an electrical drive are generated as a function of a nominal value for a movement variable, such as drive torque or rotational speed. An alternating magnetic field is generated in the drive by the drive currents. The alternating magnetic field causes movement of the drive. A first measurement signal and a second measurement signal are determined by a measurement device. The two measurement signals represent the first drive current and the second drive current. A field-producing direct-axis current component and a torque-producing quadrature-axis current component are determined as a function of the first and second measurement signals. In addition, an actual value of the movement variable is determined as a function of the measurement signals. At least one of the drive currents is generated with a variable test current component which forms a test pattern for checking the measurement device.

20 Claims, 1 Drawing Sheet

FOREIGN PATENT DOCUMENTS

| | | |
|---|---|---|
| DE | 42 34 501 A1 | 4/1994 |
| DE | 100 35 783 A1 | 2/2001 |
| DE | 10035783 * | 2/2001 |
| DE | 101 63 010 A1 | 11/2002 |
| DE | 102 19 821 A1 | 11/2003 |
| DE | 11 2004 002 619 T5 | 10/2006 |
| DE | 10 2005 045 284 A1 | 3/2007 |
| DE | 10 2006 042 038 B3 | 2/2008 |

* cited by examiner

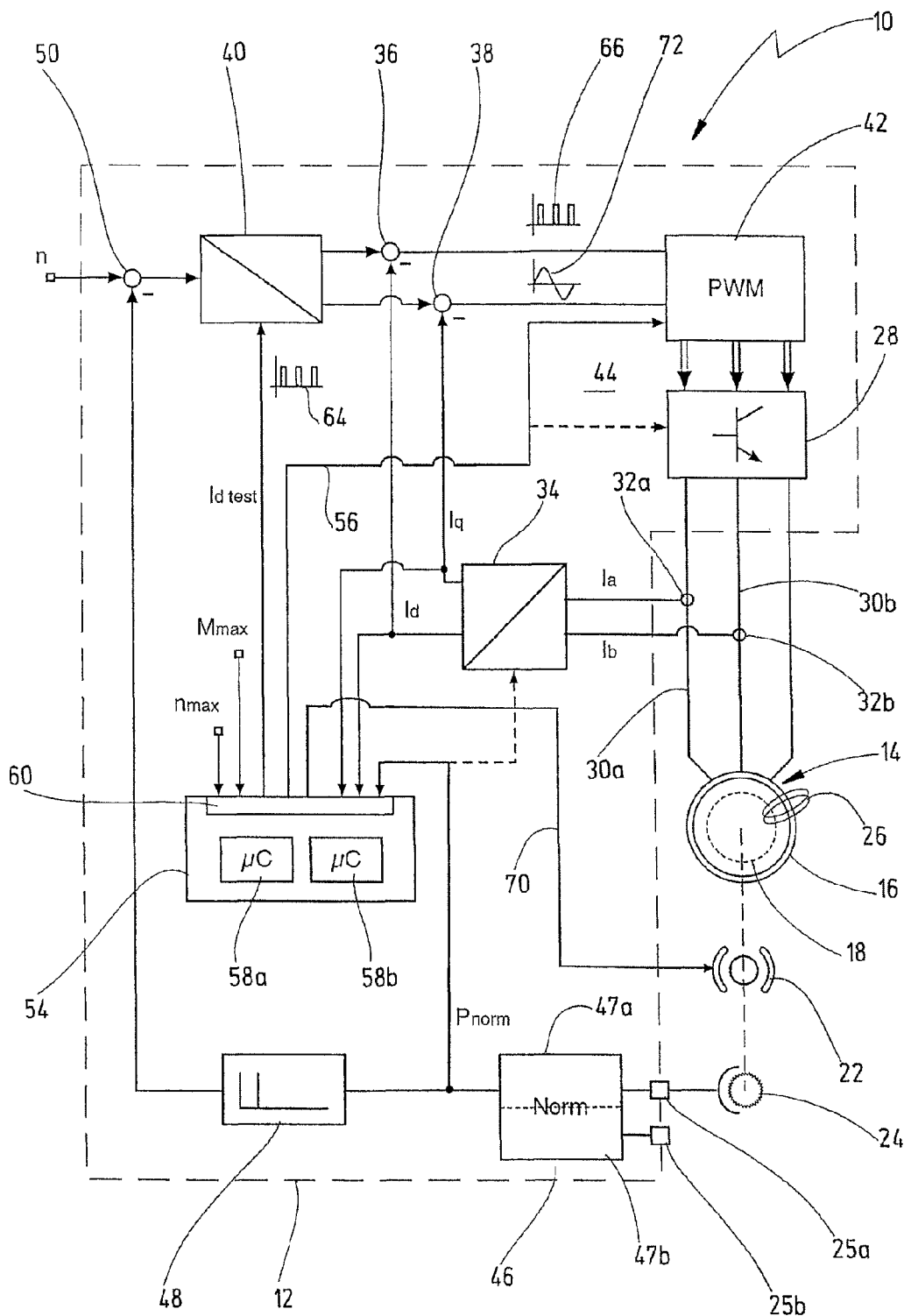

US 8,344,682 B2

METHOD AND APPARATUS FOR FAILSAFE MONITORING OF A MOVEMENT VARIABLE ON AN ELECTRICAL DRIVE

CROSS-REFERENCES TO RELATED APPLICATIONS

This application is a continuation of international patent application PCT/EP2010/060685 filed on Jul. 23, 2010 designating the U.S., which international patent application has been published in German language and claims priority from German patent application DE 10 2009 035 998.2 filed on Jul. 27, 2009. The entire contents of these priority applications are incorporated herein by reference.

BACKGROUND OF THE INVENTION

The present invention relates to a method and an apparatus for failsafe monitoring of a movement variable on an electrical drive. In particular, the invention relates to failsafe monitoring of an electrical drive for safeguarding a dangerous area on an automatically operating machine or installation, such as a machine tool, a robot, a conveyor belt or a door which opens and closes automatically.

Such danger areas of machines or installations are often safeguarded by protective fences, light barriers and other devices which prevent direct access to the danger area and/or shut down the machine or installation when the danger area is entered. However, situations exist in which access to a danger area cannot be entirely prevented, for example when setting up an automated process sequence on a machine, or in the case of an automatic door. In order to minimize the risk of injury to people even in such situations, it is known to limit movement variables of the drives causing the danger, such as a rotational speed and/or the torque of the drive, to a defined maximum value. For example, a machine tool can be operated at a reduced, limited speed when a protective door is open. In order to ensure the safety of people in these situations, the dangerous movement variables of the operating drive must be monitored in a failsafe manner.

Failsafe monitoring is usually implemented by monitoring the movement variable at least in a duplicated form, and by comparing the respective monitoring results with one another. The dangerous movement of the drive is permitted only when and for as long as the redundant monitoring results correspond.

DE 100 35 738 A1 proposes a redundant safety device for monitoring the rotation speed of a synchronous drive or of an asynchronous drive, with the rotation on the one hand being detected by a rotation-speed sensor which is connected to a drive shaft. The rotation-speed sensor generates the instantaneous rotation speed as an input variable for a drive control loop. In addition, the drive currents are measured in two of the three so-called phases of the drive. The measured drive currents are converted into a field-producing direct-axis current component and a torque-producing quadrature-axis current component. A plausibility comparison of the current values with acceleration values, which are determined using the rotation-speed signals from the rotation-speed sensor, makes it possible to detect faults in the redundant monitoring system.

DE 101 63 010 A1 discloses a further apparatus and a further method for failsafe monitoring of the speed of an electrical drive. The apparatus has two processors, which allow a cross-comparison of the monitoring results, with the two processors carrying out the monitoring in different ways. The first processor processes the regular control algorithm for closed-loop rotation-speed control, and it uses an estimated or measured rotation-speed value to carry out the monitoring. The second processor uses measured current values or a reconstruction of the control voltage in order to determine an instantaneous output frequency of the so-called frequency converter, which produces the drive currents. This method and this apparatus are intended to make it possible to dispense with a separate rotation-speed sensor. A similar apparatus is also described in DE 10 2005 045 284 A1.

The above apparatuses and methods are primarily used for monitoring a rotational speed, and thus for monitoring a speed of the drive. Monitoring for maintaining a defined torque is not provided.

DE 42 34 501 A1 discloses a method and an apparatus for redundant monitoring of the maximum torque of an electrical drive. In one channel, the instantaneous torque is determined using the drive currents. In a second channel, the instantaneous torque is estimated using an instantaneous rotation speed and using characteristics of the electrical drive, with the rotation speed again being determined by means of a rotation-speed sensor. This known method accordingly requires a separate rotation-speed sensor for torque monitoring.

SUMMARY OF THE INVENTION

Against this background, it is an object of the present invention to provide a method and an apparatus of the type mentioned above, which allow failsafe monitoring of a movement variable on an electrical drive, including failsafe monitoring of a torque, in a simple and cost-effective manner.

It is another object of the invention to provide a method and an apparatus which can advantageously be used for checking operational reliability of a mechanical brake in an arrangement, where the brake is configured to hold an electrically driven shaft.

According to a first aspect of the invention, there is provided a method for failsafe monitoring of a movement variable on an electrical drive having a stationary part and a moving part, the method comprising the steps of generating a first and at least one second drive current as a function of a nominal value of the movement variable; generating an alternating magnetic field in the drive by means of the first and second drive currents, with the alternating magnetic field causing movement of the moving part; determining a first measurement signal, which represents the first drive current, and determining a second measurement signal, which represents the second drive current, by means of a measurement device; determining a field-producing direct-axis current component and a torque-producing quadrature-axis current component as a function of the first and second measurement signals; and determining an actual value of the movement variable as a function of the first and second measurement signals, wherein at least one of the drive currents is generated with a variable test current component which forms a defined test pattern for checking the measurement device, with the test current component being selected such that the defined test pattern appears in the direct-axis current component, while the quadrature-axis current component is substantially free from the test pattern.

According to another aspect, there is provided an apparatus for failsafe monitoring of a movement variable on an electrical drive which has a stationary part and a moving part, the apparatus comprising a drive amplifier for generating a first and at least one second drive current as a function of a nominal value of the movement variable; a first current path for supplying the first drive current and at least one second current path for supplying the second drive current to the drive in order to produce an alternating magnetic field in the drive, with the alternating magnetic field causing movement of the moving part; a measurement device for determining a first measurement signal which represents the first drive current and for determining a second measurement signal which represents the second drive current; a converter for determining a field-producing direct-axis current component and a torque-producing quadrature-axis current component as a function of the first and second measurement signals; a monitoring circuit for determining an actual value of the movement variable as a function of the first and second measurement signals; and a test current generator designed to generate a variable test current component which is superposed on at least one of the drive currents, with the test current component forming a defined test pattern for checking the measurement device, and with the test current component being selected such that the defined test pattern appears in the direct-axis current component, while the quadrature-axis current component is substantially free from the test pattern.

There is also provided a method for failsafe monitoring of a movement variable on an electrical drive having a stationary part, a moving part and a mechanical brake designed to hold the moving part at a standstill against a defined braking torque, the method comprising the steps of generating a drive torque by generating a first and at least one second drive current as a function of a nominal value of the movement variable; generating a alternating magnetic field in the drive by means of the first and second drive currents, with the alternating magnetic field causing movement of the moving part; determining a first measurement signal, which represents the first drive current, and determining a second measurement signal, which represents the second drive current, by means of a measurement device; determining a field-producing direct-axis current component and a torque-producing quadrature-axis current component as a function of the first and second measurement signals; and determining an actual value of the movement variable as a function of the first and second measurement signals; wherein the movement variable represents a standstill of the moving part; and wherein the drive torque is greater than the defined braking torque Accordingly, an "artificially produced" test pattern may be used, which test pattern is superposed on the first and/or the second drive current. Typically, the test pattern is superposed on all three drive currents of a drive which is operated with three phases. The test pattern has defined and known characteristics, such as a known frequency, phase angle, amplitude, signal form, etc., and these known characteristics can be used to check whether the measurement device is operating correctly. If correct operation of the measurement device is ensured, it is sufficient to monitor the movement variable by means of the drive currents only. It is then possible to dispense with an (additional) rotation-speed sensor or a second redundant measurement path, thus allowing a very cost-effective and compact implementation.

Advantageously, a specific test signal may be used which is selected such that the defined test pattern in principle appears only in the direct-axis current component (which is determined by calculation). Preferably, the quadrature-axis current component of the drive currents is entirely free of the test pattern, i.e. the test pattern is found in the direct-axis current component only, and has no influence on the quadrature-axis current component. However, this does not preclude the possibility of a small portion of the test pattern also appearing in the quadrature-axis current component, because of technical and/or cost-dependent considerations. However, the novel method and the novel apparatus are based on the idea that, primarily, the direct-axis current component contains the test pattern and is therefore evaluated in order to check the measurement device.

The concentration of the test pattern in the direct-axis current component has the consequence that the test-current component has little or even no effect on the torque-forming component of the drive currents. The torque of the electrical drive (and in consequence also other movement variables, such as the rotation speed or the acceleration) is therefore not influenced by the test pattern. In other words, the movement variables of the drive, in particular the torque, are not changed, or are at most changed to a negligible extent, by the test pattern.

For this reason, the proposed methods and apparatus are highly suitable for monitoring the torque of an electrical drive in a cost-effective and failsafe manner. Furthermore, however, the novel method and the novel apparatus may also be used for cost-effective and failsafe monitoring of other movement variables of a drive. Accordingly, the above object is completely achieved.

In a preferred refinement, at least one of the measurement signals is measured in single-channel fashion. Preferably, the measurement device is designed in single-channel fashion for each measurement signal, i.e. the first and the second drive currents each are measured in single-channel fashion. For each of the two drive currents, this results in a single measured value or a single measurement signal, representing the instantaneous values of the drive currents at a defined instance of time.

The single-channel measurement device allows a considerably more cost-effective implementation than a two-channel or multi-channel measurement device, by means of which each measurement signal is recorded redundantly. However, a single-channel measurement device in principle involves the risk of the measured values being incorrectly recorded, without this being recognized. However, this risk is overcome in the novel method and the novel apparatus by regularly testing the measurement device by means of the test-current component. In consequence, the novel apparatus and the novel method allow cost-effective, single-channel measured-value recording for the safety-relevant monitoring of a movement variable on an electrical drive.

In a further refinement, the defined test pattern is a substantially pulse-like signal.

In this refinement, the test pattern includes a plurality of pulses, which follow one another at defined time intervals. The test pulses can follow one another at regular or irregular intervals. In some exemplary embodiments, the frequency of the pulse sequence is between 1 kHz and 50 kHz. The pulse duration of a single test pulse is preferably very short in comparison to the period of duration of the pulse sequence. A pulse-like test pattern can be evaluated in a very simple and failsafe manner. Furthermore, a test pattern such as this makes it possible to minimize the influence of the test-current component on the drive currents, and on the movement variables to be monitored.

In a further refinement, the first and second drive currents are generated by a closed control loop which uses at least the direct-axis current component as a controlled variable.

This refinement allows a very elegant and cost-effective implementation of the novel method and of the novel apparatus, since the direct-axis current component, on which the test pattern is superposed, exists as a controlled variable in any case, and can thus be evaluated easily. Furthermore, this refinement has the advantage that slow influences of the test pattern on the production of the movement variable resulting from the closed-loop control system are reduced.

In a further refinement, the test-current component is generated by means of a variable nominal value for the control loop.

This refinement allows a very simple and cost-effective implementation of the novel method and of the novel apparatus, namely by varying the nominal value for the direct-axis current control loop in accordance with the desired test pattern. Due to the control loop, the direct-axis current component is varied as a result of this, without any need for an additional signal generator.

In a further refinement, the variable nominal value forms the test pattern.

In this refinement, the "normal" or operational nominal value of the control loop for the direct-axis current component is zero, i.e. the direct-axis current component is adjusted to zero by means of the closed-loop drive control. The test pattern is now superposed on the operational nominal value of "zero". Therefore, the direct-axis current component is set to an absolute value greater than zero only during (preferably) short time intervals which are required for generating the test pattern. When the test pattern is not present or "is paused", the nominal value of the direct-axis current control loop is zero again. In this refinement, the test pattern can be identified and detected very easily on the basis of the signals present in the control loop. In some exemplary embodiments, it is sufficient to monitor the direct-axis current component for the presence of the test pattern. On the other hand, this refinement is highly suitable for monitoring movement variables of a synchronous drive, which is often used, since such a drive typically requires a quadrature-axis current component only. Accordingly, the drive is a synchronous drive in preferred variants of this refinement.

In a further refinement, the test-current component is generated by a failsafe circuit component which is designed to generate a fault signal as a function of the direct-axis current component. The failsafe circuit component preferably has at least two redundant signal processing channels for generating and/or evaluating the test-current component and the direct-axis current component with the test pattern.

This refinement allows the drive to be shut down in a failsafe manner, in a proven and reliable way, when the monitored movement variable departs from an admissible value range. This refinement therefore contributes to the novel method and the novel apparatus having a high level of failsafety, even though the at least two drive currents each are measured in a single-channel fashion.

In a further refinement, the first and second drive currents are generated by a drive controller in which the failsafe circuit component is integrated.

In this refinement, the circuit component forms an integrated part of a drive controller, which carries out all the major control functions for the monitored drive. In some exemplary embodiments, the circuit component is a plug-in board, which can be plugged into a suitable plug-in slot of a drive controller, which is not designed to be failsafe. In these exemplary embodiments, the circuit component can advantageously use the drive control loop of the drive controller to generate the test pattern in a cost-effective and elegant manner. The refinement allows the novel apparatus to be designed in a modular form, and simplifies cost-effective retrofitting of failsafe monitoring in relatively old, non-failsafe drive controllers. On the other hand, integration of the failsafe circuit component in the drive controller has the advantage that the monitoring of the movement variable does not depend on external wiring. Consequently, this reduces risks resulting from incorrect or damaged wiring.

In a further refinement, the movement variable is proportional to the quadrature-axis current component, with a fault signal being generated if the quadrature-axis current component exceeds a defined threshold value.

This refinement is highly advantageous for monitoring a maximum admissible torque of a drive in an elegant and failsafe manner. The torque monitoring can be implemented solely by means of the drive currents, which are measured in single-channel fashion, with these measurement signals being required for correct control of the drive in any case.

In a further refinement, the actual value of the movement variable is further determined by means of a sensor which produces a rotation-speed-dependent sensor signal.

This refinement allows an advantageous plausibility check with the results obtained using the measured drive currents. This refinement therefore offers an even higher level of failsafety and, furthermore, higher availability of the novel apparatus when a fault occurs in the measurement device.

In a further refinement, a sensor-independent position signal is determined as a function of the sensor signal, with said sensor-independent position signal representing an operating position of the moving part.

First of all, a position signal is determined, which position signal represents an instantaneous position of the drive, preferably as an absolute value in a defined coordinate system of the drive. The position signal advantageously is a digital signal, which is independent of the type of sensor used. By way of example, the sensor may be an incremental sensor, with the incremental steps being recorded optically, inductively and/or capacitively. In other exemplary embodiments, the sensor may produce a signal which indicates the instantaneous position of the drive by means of a Gray code. In yet other exemplary embodiments, the sensor may be a resolver, which produces an analog sine signal and an analog cosine signal, from which the instantaneous position of the drive can be determined. The sensor-independent position signal is the same in all cases. It preferably produces an absolute position of the drive in the form of a digital signal, with the sensor-independent position signal being used for closed-loop control of the drive and/or for monitoring the movement variable. The refinement offers the user a high level of flexibility in the choice of the sensor, and allows a particularly cost-effective implementation of the novel apparatus and of the novel method.

In a further refinement, a drive torque is generated by means of the first and second drive currents, which drive torque is greater than a defined braking torque of a mechanical brake, with the movement variable representing a standstill of the moving part.

In this refinement, the novel apparatus and the novel method allow a simple and cost-effective functional check of an external brake for the drive by producing a drive torque on a test basis which is greater than the required maximum braking torque of the brake. When the drive is at standstill despite this drive torque with the brake closed (with the maximum required braking torque), this indicates reliable operation of the external brake. The monitoring of the standstill can be carried out in a simple and elegant manner solely using the measured drive currents, if failsafe measurement is ensured. In the novel method and the novel apparatus, the latter is achieved by means of the novel test pattern.

It goes without saying that the abovementioned features and those which are still to be explained in the following text can be used not only in the respectively stated combination but also in other combinations or on their own, without departing from the scope of the present invention.

BRIEF DESCRIPTION OF THE DRAWINGS

Exemplary embodiments of the invention will be explained in the following text with reference to a drawing. The single FIG. 1 shows a schematic illustration of an exemplary embodiment of the novel apparatus and the novel method, using a closed control loop.

DESCRIPTION OF PREFERRED EMBODIMENTS

In FIG. 1, an apparatus according to an exemplary embodiment of the invention is designated with the reference number 10 in its entirety. The apparatus 10 comprises a drive controller 12 for operational control of a drive 14. The drive 14 has a stationary part (stator) 16 and a moving part 18, which in this case is in the form of a rotor. In this case, the rotor 18 is arranged as an internal rotor within the stator 16. In principle, however, the novel apparatus and the novel method may also be used for drives with an externally rotating rotor and, furthermore, also for electrical drives which carry out a translational movement instead of a rotary movement (linear drives).

The rotor 18 is connected via a shaft 20 to a mechanical brake 22 and to a sensor 24. By way of example, the sensor 24 is an incremental sensor, with the rotary movement of the shaft 20 being recorded optically, inductively and/or capacitively. Furthermore, the sensor 24 could be a resolver or an absolute-value sensor, which produces a rotation-angle position of the shaft 20 in the form of a digital value. In some exemplary embodiments, the drive controller 12 has a housing with a plurality of connecting sockets 25a, 25b, with each connecting socket 25 being designed for connection of a different sensor type. By way of example, the connecting socket 25a is in the form of a standard socket for connection of incremental sensors, while the connecting socket 25b is in the form of a standard socket for connection of a resolver or of a Gray code sensor. The sockets 25a, 25b accordingly have the conventional mechanical shape and the conventional number of contact pins for connection of the respective sensors.

The drive controller 12 generates a alternating magnetic field 26 in the drive 14, which alternating field is illustrated here merely in a simplified form, with two magnetic field lines. The alternating field 26 is generated by means of drive currents generated by a drive amplifier 28. The drive amplifier 28 is connected via three lines 30a, 30b, 30c to drive 14. Each of the three lines 30 carries a drive current, with the three drive currents normally being sinusoidal signals with the same amplitude, and shifted in phase relative to one another. The three drive currents together produce the alternating field 26, which in general revolves around the stator 16 and moves the rotor 18.

Reference symbols 32a, 32b denote two measurement points of a measurement device 32, by means of which two of the three drive currents are measured. The two measured drive currents are in this case denoted by $I_a$ and $I_b$. By way of example, the measurement device 32 may include shunt resistors, across which the drive currents are tapped off in the form of voltage signals. In principle, all three drive currents in the supply lines 30 could be measured and evaluated. However, since there is a fixed relationship between the three drive currents, it is sufficient to measure two of the three drive currents.

Reference number 34 denotes a converter, which determines a quadrature-axis current component $I_q$ and a direct-axis current component $I_d$ as a function of the measured drive currents $I_a$, $I_b$. The quadrature-axis current component $I_q$ is that component of the resultant current vector of the three drive currents which is responsible for generation of the torque in the rotor 18. The quadrature-axis current component $I_q$ is therefore a current component which flows at right angles to the magnetic field in the rotor 18.

The direct-axis current component $I_d$ is the orthogonal component of the resultant current vector and does not contribute to form a torque in the rotor 18, because the current flows parallel to the lines of force in the rotor 18. The direct-axis current component $I_d$ and the quadrature-axis current component $I_q$ are determined as a function of the measured drive currents $I_a$, $I_b$ by means of transformation equations, which are known to a person skilled in the art of electrical drives, and which are not described in detail here, for sake of simplicity.

The direct-axis current component $I_d$ and the parallel current $I_q$ each are supplied to a summation point 36, 38. Summation point 36 further receives a nominal value for the series current $I_d$, generated by another converter 40. Summation point 38 receives a nominal value for the parallel current $I_q$, which in this case is also generated by converter 40. Converter 40 in this case determines the two nominal values $I^*_d$, $I^*_q$ as a function of a nominal rotation speed n* at which the rotor 18 of the drive 14 is intended to rotate. A difference between the respective nominal values $I^*_d$ and $I^*_q$ and the respective actual values $I_d$ and $I_q$ generated by converter 34 is determined at the summation points 36, 38, respectively.

The difference in each case results in a control error, which is supplied to a control unit 42. As a function of the control errors, the control unit 42 determines control signals for the drive amplifier 28, which generate the drive currents for the drive 14. The control unit 42 typically generates pulse-width-modulated control signals, which are used to operate switching transistors in the drive amplifier 28.

Overall, the drive amplifier 28, the measurement device 32, the converters 34 and 40, the summation points 36, 38 and the control unit 42 form a closed control loop 44, by means of which the drive currents are generated as a function of an external nominal value, such as the rotation speed n*.

In the present exemplary embodiment, the apparatus 10 comprises a further superordinate control loop for the rotation speed n of the drive 14. The further control loop includes rotation-speed sensor 24, whose output signal is supplied via the connecting socket 25a to a position calculation unit 46. The position calculation unit 46 is designed to determine a sensor-independent position value $P_{norm}$, which represents an instantaneous rotation-angle position of the rotor 18 relative to a reference point. The position calculation unit 26 in this case produces the position value $P_{norm}$ in a normalized manner, independent of the type of sensor 24, in particular as a digital position value. In the preferred exemplary embodiments, the position calculation unit 46 receives the output signals from a sensor 24, which is connected to the sockets 25a, 25b, as analog signals, and determines the digital position value $P_{norm}$ as a function of the analog signals.

In this case, the position calculation unit 46 has a plurality of mutually different signal paths 47a, 47b, with each signal path being designed for processing a different sensor type. Each signal path 47a, 47b is connected to one of the sockets 25a, 25b, to which a sensor of the type appropriate for that signal path can be connected. Because of the various signal paths 47a, 47b, the position calculation unit 46 is a relatively complex circuit component, which, however, allows a high level of flexibility for connection of sensors. In some exemplary embodiments, the position calculation unit 46 is an ASIC. A complex circuit component is intrinsically disadvantageous if the signals and/or information of the circuit component are/is required for safety-relevant functions, such as failsafe rotation-speed and/or torque monitoring. However, in the present case, the position calculation unit 46 can be implemented in a complex form because the monitoring based on current measurement provides a redundant second channel, as a result of which there is no need for fault analysis with respect to details of the position calculation unit 46.

Reference number 48 denotes a differentiating element, which receives the normalized position value $P_{norm}$ and produces at its output a differentiated position value, which represents an instantaneous rotation speed n of the rotor 18. The instantaneous rotation speed n is subtracted from the externally supplied nominal rotation speed n* at a summation point 50. The difference is supplied as a control error to converter 40, which determines the nominal values, $I^*_d$, $I^*_q$ for the direct-axis current component and the quadrature-axis current component, as a function of this control error.

Reference number 54 denotes a circuit component which, inter alia, receives the direct-axis current component $I_d$ and the quadrature-axis current component $I_q$ from converter 34. Furthermore, circuit component 54 can receive the normalized position value $P_{norm}$ from position calculation unit 46, and/or the measured currents $I_a$, $I_b$.

In addition, circuit component 54 in this case receives a threshold value for a maximum admissible torque $M_{max}$, and a further threshold value for a maximum admissible rotation speed $n_{max}$. The threshold values $M_{max}$ and $n_{max}$ are parameters which are set during configuration of the apparatus 10, and are stored in a memory in the circuit component 54.

The circuit component 54 is designed to monitor the instantaneous rotation speed n and the actual torque M of the drive 14. If the actual value of the torque M and/or the rotation speed n exceed(s) the chosen maximum values, the circuit component 54 produces a fault signal 56, which in this case is supplied to the control unit 42 and/or to the drive amplifier 28. The circuit component 54 can use the fault signal 56 to prevent the generation of the pulse-width-modulated control signals for the drive amplifier 28, and/or to disconnect the drive amplifier 28 from the pulse-width-modulated control signals. Without these control signals, the drive amplifier 28 does not generate any drive currents. In consequence, the drive 14 is disconnected from the circuit component 54 by means of the fault signal 56. Furthermore, the fault signal 56 can activate a signaling light (not illustrated) and/or can disconnect one or more external contactors (not illustrated), whose normally-open contacts are arranged in the lines 30, and by means of which the drive 14 is disconnected from the drive amplifier 28.

In preferred exemplary embodiments, circuit component 54 is designed to have multi-channel redundancy. This is illustrated in the figure by two redundant microcontrollers 58a, 58b. As an alternative to one or both microcontrollers 58a, 58b, circuit component 54 could comprise dedicated logic circuits, such as an ASIC. Reference number 60 represents an interface via which the circuit component 54 receives the input signals from converter 34, inter alfa, and can provide output signals, such as the fault signal 56.

The actual torque of drive 14 is proportional to the quadrature-axis current component $I_q$. The two channels 58a, 58b of the circuit component 54 in this case determine the actual torque as a function of the quadrature-axis current component $I_q$, redundantly with respect to one another.

In order to ensure failsafe current measurement of the drive currents $I_a$, $I_b$, and therefore failsafe determination of the quadrature-axis current component $I_q$, circuit component 54 checks the measurement device 32 and converter 34 by means of a specifically generated test pattern 64. Circuit component 54 is designed to produce the test pattern 64 as a nominal-value variation for the direct-axis current component $I_d$. The test pattern 64 is supplied to converter 40, which determines the nominal values for the direct-axis current component $I_d$ and $I_q$. In the simplest case, converter 40 adds digital values, which represent the test pattern 64, to the operational nominal value for the direct-axis current component $I_d$.

In a preferred exemplary embodiment, drive 14 is a synchronous drive, for which the direct-axis current component $I_d$ is adjusted to zero during operation. In consequence, series current $I_d$ is in this case "modulated" with a pulse-like signal 66 having a plurality of successive pulses, which correspond to the test pattern 64. In contrast, the quadrature-axis current component $I_q$ is regulated with a "normal" profile during operation. The pulse-like signal 66 is processed by the control unit 42, and in consequence varies the drive currents for the drive 14.

Circuit component 54 receives the direct-axis current component $I_d$, which is determined from the measured drive currents, from the converter 34, and can therefore use the test pattern 64 to check whether the current measurement and converter 34 operate without any faults.

In the illustrated exemplary embodiment, circuit component 54 furthermore determines an actual value for the rotation speed of the drive 14, as a function of the quadrature-axis current component $I_q$ and the direct-axis current component $I_d$, and checks whether the rotation-speed actual value is less than the chosen threshold value $n_{max}$. In a second channel, circuit component 54 evaluates the normalized position value $P_{norm}$ and/or the actual rotation speed n, determined by differentiator 48, of the sensor 24. As an alternative to this, circuit component 54 can also monitor the actual rotation speed without a sensor 24, solely on the basis of the current components $I_q$ and $I_d$.

In a preferred exemplary embodiment, drive controller 12 is also able to use the circuit component 54 to check the function of brake 22. For this purpose, circuit component 54 produces a brake signal 70, which closes brake 22 with a maximum possible braking torque. Furthermore, drive controller 12 uses converter 40 to produce a quadrature-axis current component 72, which results in a drive torque in the drive 14. Circuit component 54 now uses the measured drive currents and the current components $I_q$, $I_d$ derived from them, and/or sensor 24, to monitor whether or not rotor 18 and shaft 20 are at a standstill. In the former case, brake 22 is able to stop drive 14 against the drive torque produced, i.e. brake 22 operates. In the latter case, brake 22 is not (or no longer) able to ensure that shaft 20 is kept stationary. In this case, circuit component 54 advantageously produces the fault signal 56 once again.

The novel method and the novel apparatus are highly suitable for monitoring a movement variable for a synchronous drive. The novel apparatus and the novel method are particularly advantageous for a synchronous drive that has a strong permanent magnet in the rotor because, in this case, the test pattern 64 of the field-producing direct-axis current component $I_d$ has hardly any or no detectable influence on the magnetic field of the rotor 18, which is required anyway. In principle, however, the novel method and the novel apparatus may also be used for other rotating-field machines including asynchronous machines. Furthermore, the novel method and the novel apparatus can also be used for translationally moving drives.

What is claimed is:

1. A method for failsafe monitoring of a movement variable on an electrical drive having a stationary part and a moving part, the method comprising the steps of:
generating a first and at least one second drive current as a function of a nominal value of the movement variable,
generating an alternating magnetic field in the electrical drive by means of the first and second drive currents, with the alternating magnetic field causing movement of the moving part,
determining a first measurement signal, which represents the first drive current, and determining a second measurement signal, which represents the second drive current, by means of a measurement device,
determining a field-producing direct-axis current component and a torque-producing quadrature-axis current component as a function of the first and second measurement signals, and
determining an actual value of the movement variable as a function of the first and second measurement signals,
wherein at least one of the drive currents is generated with a variable test current component which forms a defined test pattern for checking the measurement device, with the test current component being selected such that the defined test pattern appears in the direct-axis current component, while the quadrature-axis current component is substantially free from the test pattern.

2. The method of claim 1, wherein at least one of the first and second measurement signals is measured in a single-channel fashion.

3. The method of claim 1, wherein the defined test pattern substantially is a pulse signal.

4. The method of claim 1, wherein the first and second drive currents are generated with a closed control loop which uses at least the direct-axis current component as a controlled variable.

5. The method of claim 4, wherein the test current component is generated by providing a variable nominal value for the control loop.

6. The method of claim 5, wherein the variable nominal value forms the test pattern.

7. The method of claim 1, wherein the test current component is generated by a failsafe circuit component which is designed to produce a fault signal as a function of the direct-axis current component.

8. The method of claim 7, wherein the first and second drive currents are generated by a drive controller in which the failsafe circuit component is integrated.

9. The method of claim 1, wherein the movement variable is proportional to the quadrature-axis current component, with a fault signal being generated if the quadrature-axis current component exceeds a defined threshold value.

10. The method of claim 1, wherein the actual value of the movement variable is further determined by means of a sensor which produces a rotation-speed-dependent sensor signal.

11. The method of claim 10, wherein a sensor-independent position signal is determined using the sensor signal, said sensor-independent position signal representing an operating position of the moving part as a digital value that is independent from characteristics of the sensor.

12. The method of claim 1, wherein a drive torque is generated by means of the first and second drive currents, which drive torque is greater than a defined braking torque of a mechanical brake, wherein the movement variable represents a standstill of the moving part.

13. An apparatus for failsafe monitoring of a movement variable on an electrical drive which has a stationary part and a moving part, the apparatus comprising:
a drive amplifier for generating a first and at least one second drive current as a function of a nominal value of the movement variable,
a first current path for supplying the first drive current and at least one second current path for supplying the second drive current to the drive in order to produce an alternating magnetic field in the electrical drive, with the alternating magnetic field causing movement of the moving part,
a measurement device for determining a first measurement signal which represents the first drive current and for determining a second measurement signal which represents the second drive current,
a converter for determining a field-producing direct-axis current component and a torque-producing quadrature-axis current component as a function of the first and second measurement signals,
a monitoring circuit for determining an actual value of the movement variable as a function of the first and second measurement signals, and
a test current generator designed to generate a variable test current component which is superposed on at least one of the drive currents,
with the test current component forming a defined test pattern for checking the measurement device, and
with the test current component being selected such that the defined test pattern appears in the direct-axis current component, while the quadrature-axis current component is substantially free from the test pattern.

14. A method for failsafe monitoring of a movement variable on an electrical drive having a stationary part, a moving part and a mechanical brake designed to hold the moving part at a standstill against a defined braking torque, the method comprising the steps of:
generating a drive torque by generating a first and at least one second drive current as a function of a nominal value of the movement variable,
generating an alternating magnetic field in the electrical drive by means of the first and second drive currents, with the alternating magnetic field causing movement of the moving part,
determining a first measurement signal, which represents the first drive current, and determining a second measurement signal, which represents the second drive current, by means of a measurement device,
determining a field-producing direct-axis current component and a torque-producing quadrature-axis current component as a function of the first and second measurement signals, and
determining an actual value of the movement variable as a function of the first and second measurement signals,
wherein the movement variable represents a standstill of the moving part, and
wherein the drive torque is greater than the defined braking torque.

15. The method of claim 14, wherein at least one of the drive currents is generated with a variable test current component which forms a defined test pattern for checking the measurement device, with the test current component being selected such that the defined test pattern appears in the direct-axis current component, while the quadrature-axis current component is substantially free from the test pattern.

16. The method of claim 14, wherein at least one of the first and second measurement signals is measured in a single-channel fashion.

17. The method of claim 14, wherein the first and second drive currents are generated with a closed control loop which uses at least the direct-axis current component as a controlled variable, with the test current component being generated by means of a variable nominal value for the control loop.

18. The method of claim 17, wherein the variable nominal value forms the test pattern.

19. The method of claim 14, wherein the test current component is generated by a failsafe circuit component which is designed to produce a fault signal as a function of the direct-axis current component.

20. The method of claim 19, wherein the first and second drive currents are generated by a drive controller in which the failsafe circuit component is integrated.

* * * * *